June 23, 1964  E. J. MERRELL  3,138,656
ELECTRIC CABLE CONNECTION
Filed July 31, 1961
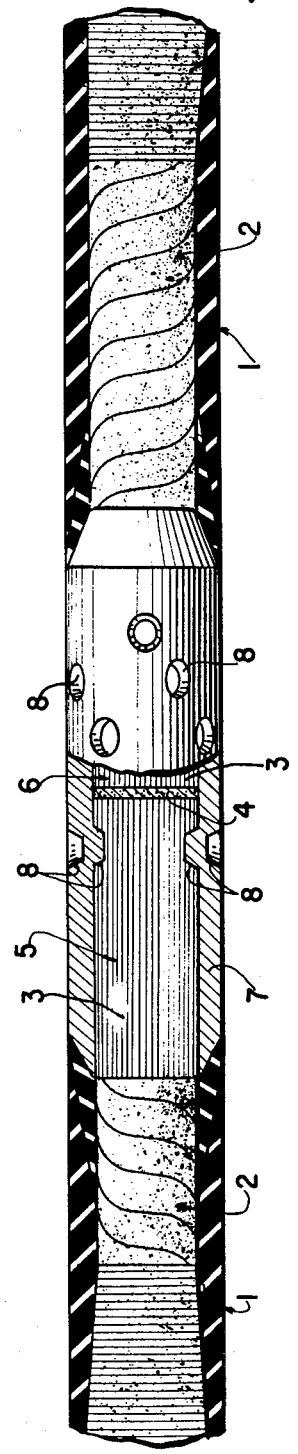
INVENTOR
EDWIN J. MERRELL
BY
*Davis, Hoxie Faithfull & Hapgood*
ATTORNEYS

United States Patent Office 3,138,656
Patented June 23, 1964

3,138,656
ELECTRIC CABLE CONNECTION
Edwin J. Merrell, Scarsdale, N.Y., assignor to Phelps Dodge Copper Products Corporation, New York, N.Y., a corporation of Delaware
Filed July 31, 1961, Ser. No. 128,128
2 Claims. (Cl. 174—84)

The present invention relates to electric cable and more particularly to a method of splicing such cable and the novel splice produced thereby.

Electric power cables having an aluminum inner conductor were heretofore spliced by mechanical connectors or by welding, both of which have serious disadvantages. Mechanical connectors are usually attached by being compressed on the ends of the two conductors to be joined. A film of aluminum oxide forms on the interface between the conductor and the connector when exposed to air, causing an area of high resistance. With high-voltage electrical loads, the area of high resistance may cause failure of the splice due to heat generated because there is insufficient conductive contact between the conductor and the connector to carry the electrical load. Power cables spliced with mechanical connectors, even in the absence of air, may have high resistance due to spacings in the joint caused by the stress and strain expansions of aluminum, which tend to loosen the contact to the connector due to self-ratcheting when subjected to electrical load cycling.

Welding, which avoids the problem of high resistance at the splice, has the disadvantage of annealing the metal adjacent to the weld to form a structurally weak place in the cable. Under current load cycling the strain may lead to a tensile break at the welded splice. If the low-temperature welding is used to avoid annealing the area, the splice will also be structurally weak. The strength of the splice is of special importance in pipeline cable systems in which the splice is in the direction of the cable and not in a lateral offset as in the case of the duct and manhole systems.

It is an objective of the present invention to provide a cable splice for aluminum power cables that is structurally strong, has low resistivity, and retains its strength and low resistivity under repeated load cycles.

It is a further objective that the cable splice withstand tensions and compressions due to thermal expansions and contractions found in pipe-line cable systems.

It is a still further objective to provide a method of splicing aluminum power cables to produce such a splice.

In accordance with the present invention the two ends of the aluminum conductor to be spliced are welded using high-annealing methods. A mechanical connector, preferably in the form of a tubular sleeve, is then secured over the welded cable ends.

Other features of the present invention will be apparent with the following detailed description of a preferred embodiment, together with the accompanying drawing in which the single figure is a side elevational view, partly in section, showing a power cable spliced according to the present invention.

The drawing shows two interconnected power cables each comprising outer insulation 1, inner insulating tape 2 and an inner conductor in the form of a bundle of aluminum strands 3.

The splice comprises a high-annealed butt weld 4 between the opposed ends of the left-hand and right-hand conductors, indicated generally at 5 and 6, respectively. A mechanical connector 7, consisting of a conductive sleeve, is secured over weld 4 and over those portions of conductors 5 and 6 adjacent to the weld. Connector 7 is fastened to conductors 5 and 6 by indented portions 8.

To make the splice of the present invention, an operator first pushes connector 7 back over conductor 5, the cable insulation having been cut back far enough so that the end of conductor 5 protrudes from the connector 7. He then butt-welds conductors 5 and 6 together at weld 4, using a suitable flux and a low-temperature welding heat source. Weld 4 is covered by pushing connector 7 forward over the weld, and the connector is fastened over the weld by indentations 8 which are compressed in the conductor by a ram-operated indentation tool. The cut-back insulation may then be replaced; and insulation such as tape (not shown) may then be secured over connector 7.

It will be apparent that the indentations 8 form recesses in the generally cylindrical surfaces of the respective conductors 5 and 6, and the metal of connector 7 which is displaced by formation of these indentations constitutes pinning means integral with the connector extending inwardly therefrom and closely fitted in such recesses for positively securing the connector to the end portions of the conductors. Thus, the connector sleeve 7 adequately protects the weld metal 4 from stresses.

Modifications may be made in the present invention within the scope of the subjoined claims.

I claim:

1. In combination with two lengths of power cable each having a generally cylindrical aluminum conductor and a generally cylindrical insulation covering closely surrounding the conductor, said covering being cut back from opposing ends of the conductors to expose adjacent end portions of the respective conductors, a splice comprising a butt-weld joining said opposing ends of the conductors, a mechanical connector sleeve having an external diameter approximating the external diameter of said cylindrical coverings and having an internal diameter approximating the diameter of said cylindrical conductors, said sleeve extending closely and completely around the butt-weld and around said exposed end portions of the respective conductors adjacent said weld, said end portions having recesses in their generally cylindrical surfaces and having a substantially uniform diameter throughout the lengths thereof, and pinning means integral with the sleeve and closely fitted in said recesses; whereby the pinning means penetrate said cylindrical surfaces to positively secure the sleeve to said end portions.

2. A splice as defined in claim 1, in which the connector sleeve is indented to form inwardly extending protrusions constituting said pinning means.

References Cited in the file of this patent

UNITED STATES PATENTS

| 1,363,355 | Sander | Dec. 28, 1920 |
| 1,707,317 | Pipes | Apr. 12, 1929 |
| 2,062,886 | Jensen | Dec. 1, 1936 |
| 2,446,542 | MacInnes | Aug. 10, 1948 |
| 2,801,402 | Barnes | July 30, 1957 |